(12) United States Patent
Hatakenaka et al.

(10) Patent No.: US 7,849,950 B2
(45) Date of Patent: Dec. 14, 2010

(54) BRAKE APPARATUS FOR VEHICLE

(75) Inventors: Hideaki Hatakenaka, Tokyo (JP);
Osamu Saito, Tokyo (JP); Shiro Ezoe,
Tokyo (JP)

(73) Assignee: Fuji Jukogyo Kabushiki Kaisha, Tokyo
(JP)

( * ) Notice: Subject to any disclaimer, the term of this patent is extended or adjusted under 35 U.S.C. 154(b) by 628 days.

(21) Appl. No.: 11/664,327

(22) PCT Filed: Apr. 14, 2005

(86) PCT No.: PCT/JP2005/007246

§ 371 (c)(1),
(2), (4) Date: Mar. 29, 2007

(87) PCT Pub. No.: WO2006/038333

PCT Pub. Date: Apr. 13, 2006

(65) Prior Publication Data

US 2009/0200781 A1    Aug. 13, 2009

(30) Foreign Application Priority Data

Sep. 30, 2004    (JP) .............................. 2004-287740

(51) Int. Cl.
*G05G 1/32* (2008.04)

(52) U.S. Cl. ..................... 180/274; 74/512; 74/560; 180/275

(58) Field of Classification Search .............. 74/512, 74/560; 180/274, 275, 443; 280/87.1, 779
See application file for complete search history.

(56) References Cited

U.S. PATENT DOCUMENTS

| | | | |
|---|---|---|---|
| 5,778,732 A * | 7/1998 | Patzelt et al. .................. 74/512 |
| 6,055,883 A * | 5/2000 | Kato ............................. 74/512 |
| 6,101,894 A * | 8/2000 | Tiemann et al. ............... 74/512 |
| 6,209,416 B1 * | 4/2001 | Tiemann et al. ............... 74/512 |
| 6,336,376 B1 * | 1/2002 | Lee ............................... 74/512 |
| 6,339,971 B1 * | 1/2002 | Kato ............................. 74/512 |
| 6,499,376 B2 * | 12/2002 | Thistleton et al. ............. 74/512 |
| 6,701,800 B2 * | 3/2004 | Saitou et al. .................. 74/512 |
| 6,752,038 B2 * | 6/2004 | Cordero ........................ 74/512 |
| 7,066,047 B2 * | 6/2006 | Amano et al. ................. 74/512 |
| 7,240,581 B2 * | 7/2007 | Lee ............................... 74/512 |
| 7,669,896 B2 * | 3/2010 | Sanagi et al. ................ 280/750 |

FOREIGN PATENT DOCUMENTS

| | | |
|---|---|---|
| JP | 9-254821 A | 9/1997 |
| JP | 9-290716 A | 11/1997 |
| JP | 10-44947 A | 2/1998 |
| JP | 10-236335 A | 9/1998 |

(Continued)

*Primary Examiner*—Faye M. Fleming
*Assistant Examiner*—Laura Freedman
(74) *Attorney, Agent, or Firm*—Smith, Gambrell & Russell

(57) ABSTRACT

A brake apparatus (1) for a vehicle, having: a pedal box (5) which is provided on a partition panel (4) extending in approximately upward and downward directions and which pivotally supports the brake pedal (3). An electric motor (7) of a power steering apparatus is arranged at a position where the electric motor makes contact with the brake pedal (3) moving backward at a time of a front collision of the vehicle, to receive a load from the brake pedal (3) by the electric motor (7).

12 Claims, 6 Drawing Sheets

FOREIGN PATENT DOCUMENTS

| | | |
|---|---|---|
| JP | 11-43073 A | 2/1999 |
| JP | 2001-151089 A | 6/2001 |
| JP | 2002-46584 A | 2/2002 |
| JP | 2002-178940 A | 6/2002 |
| JP | 2002-362339 A | 12/2002 |
| JP | 2003-2179 | 1/2003 |
| JP | 2001-307190 | 4/2003 |
| JP | 2003112614 A * | 4/2003 |

* cited by examiner

BRAKE APPARATUS FOR VEHICLE

FIELD OF THE INVENTION

The present invention relates to a brake apparatus for a vehicle, in which a brake pedal is supported by a pedal box provided on a partition panel.

BACKGROUND OF THE INVENTION

Generally, an automobile has a structure in which a brake pedal is provided on a partition panel separating the front side of the interior space, through a pedal box. In such a brake apparatus for a vehicle, at a time of front collision of the vehicle, the partition panel is moved backward with being deformed, and accordingly, also the pedal box and the brake pedal follow this to be moved backward.

At this time, the movement of the pedal box and the brake pedal in backward and upward direction may make a pad provided on the lower end of the brake pedal contact with a lower leg of a driver. In order to resolve the problem, a structure in which a guide member for guiding the pedal box in backward and downward direction at a time of front collision of the vehicle is provided on a steering support beam, is known (for example, refer to Patent Document 1).

Patent Document 1: JP-Tokukai-2003-112614A

SUMMARY OF THE INVENTION

Problem to be Solved by the Invention

Although the above-described brake apparatus can suppress upward movement of the pedal box at a time of front collision of the vehicle, the brake pedal may rotate around the pedal box to protrude the lower end side thereof backward. Therefore, the apparatus cannot control backward movement of the brake pedal sufficiently. In particular, in a case of a pedal bracket for supporting the pedal box from above is provided on the partition panel, when the deformation amount of the lower side of the partition panel is large, the pedal box is moved backward for a distance larger than that of the pedal bracket, so that the backward protrusion action of the lower end side of the brake pedal occurs notably.

Since almost load applied to the pedal box and the brake pedal at a time of front collision of the vehicle acts on a guide member, the steering support beam goes back. As a result, such the apparatus has a further problem that the amount of backward movement of the steering wheel becomes large.

The present invention has been developed in view of the above circumstances. An object of the invention is to provide a brake apparatus for a vehicle, which can reduce the amount of backward movement of the brake pedal at a time of front collision of the vehicle and can reduce the amount of backward movement of the steering wheel.

Means for Solving the Problem

In order to achieve the above object, the invention described in claim 1 is a brake apparatus for a vehicle, including: a pedal box which is provided on a partition panel extending in approximately upward and downward directions and which pivotally supports the brake pedal, wherein an electric motor of a power steering apparatus is arranged at a position where the electric motor makes contact with the brake pedal moved backward at a time of a front collision of the vehicle.

According to the invention described in claim 1, because the brake pedal gets into contact with the electric motor of the power steering apparatus, a reaction force is given to the brake pedal from the electric motor, so that the backward movement of the brake pedal is controlled. Here, when the brake pedal rotates around the pedal box, because the brake pedal gets into contact with the electric motor at a position apart from the pedal box, it is possible to counter with the moment caused in the brake pedal by a relatively small reaction force.

In the invention, since there are no concentration of load to the steering support beam from the pedal box and the brake pedal, unlike the conventional technique, it is possible to reduce the amount of backward movement of the steering support beam and the steering wheel. Specifically, in a case that the electric motor is mounted to the lower side of the steering column, the electric motor is moved backward by the load from the brake pedal, and then the steering column is rotated around the steering support beam. As a result, the steering wheel which is in the upper side of the steering column moves forward relatively with respect to the steering support beam. Thereby, backward movement of the steering wheel is effectively restrained.

The invention described in claim 2 is the brake apparatus for a vehicle, as claimed in claim 1, wherein the brake pedal includes a protrusion portion formed to protrude toward the electric motor.

According to the invention described in claim 2, the same function as that of claim 1 is given, and since the protrusion portion is formed on the brake pedal, only portion necessary for being contact with the electric motor comes to protrude backward, with leaving the position of the pad of the brake pedal and the like as it is.

In order to bring the brake pedal into contact with the electric motor at a time of a front collision of the vehicle, it is preferable to have a structure in which the brake pedal is close to the electric motor. However, since the brake pedal is operated by an occupant pressing the pad which is at a lower end, it is necessary to ensure a space for operation behind the pad of the brake pedal. Therefore, the brake pedal comes to be provided close to the partition panel.

Accordingly, it is possible to bring the brake pedal into certain contact with the electric motor at a time of a front collision of the vehicle, without necessity of the brake pedal having a whole shape extending backward, and providing increase of production costs and the like due to weight increase or layout change of the brake pedal.

The inventions described in claims 3 and 4 are the brake apparatuses for vehicles, as claimed in claims 1 and 2, respectively, wherein a steering support beam is provided with a guide member to control upward movement of the brake pedal at the time of a front collision of the vehicle.

According to the invention described in any one of claims 3 and 4, the same function as that of claim 1 or 2 is given, and in a case that the pedal box, the pedal bracket and the like are not only moving backward but also moving upwards at a time of a front collision of the vehicle, these parts make contact with the guide member to correct only backward movement without moving upwards. Thereby, upward and backward movement of the brake pedal 3 is restrained. As a result, it is possible to prevent the pad which is provided at the lower end of the brake pedal, from becoming contact with the lower leg of the driver.

The inventions described in claims 5-8 are the brake apparatuses for vehicles, as claimed in claims 1-4, respectively, wherein the apparatus further includes a pedal bracket which is provided on the partition panel, to support the pedal box from above; the pedal box is secured to the pedal bracket by a bolt; and a bolt hole is formed to have an opening which opens approximately backward, in the pedal bracket.

According to the invention described in any one of claims 5-8, the same function as that of claims 1-4 is given, and in such a manner, support for the pedal box by the pedal bracket improves the stiffness and strength of the pedal box, and therefore enhances the operational feeling and reliability of the brake pedal.

Since the bolt hole of the pedal bracket is opened approximately backward, when the pedal box relatively moves backward with respect to the pedal bracket at a time of a front collision of the vehicle, the bolt get out of the bolt hole of the pedal bracket through the opening, the attachment thereof is released, and the pedal bracket moves backward independent of the pedal box. Accordingly, it is possible to keep enhancement of the operational feeling and reliability of the brake pedal, and a stable backward movement of the brake pedal, at a time of a front collision of the vehicle. Therefore, it has a great practical advantage The inventions described in claims 9-12 are the brake apparatuses for vehicles, as claimed in claims 5-8, respectively, wherein the opening of the bolt hole is formed in the pedal bracket so that the pedal bracket does not interfere with the bolt moving backward at the time of front collision of the vehicle.

According to the invention described in any one of claims 9-12, the same function as that of claims 5-8 is given, and further, it is possible to leave the bolt smoothly out of the bolt holes at the time of front collision of the vehicle because the pedal bracket does not interfere with the bolt moving backward at the time of front collision. Thereby backward movement behavior of the brake pedal can be stabilized effectively.

EFFECT OF THE INVENTION

As described above, according to the invention, it is possible to reduce the amount of backward movement of the brake pedal at a time of front collision of the vehicle and to reduce the amount of backward movement of the steering wheel. As a result, safety of occupants at a time of front collision of the vehicle can be enhanced remarkably.

BEST MODE TO PERFORM THE INVENTION

Figure 1:
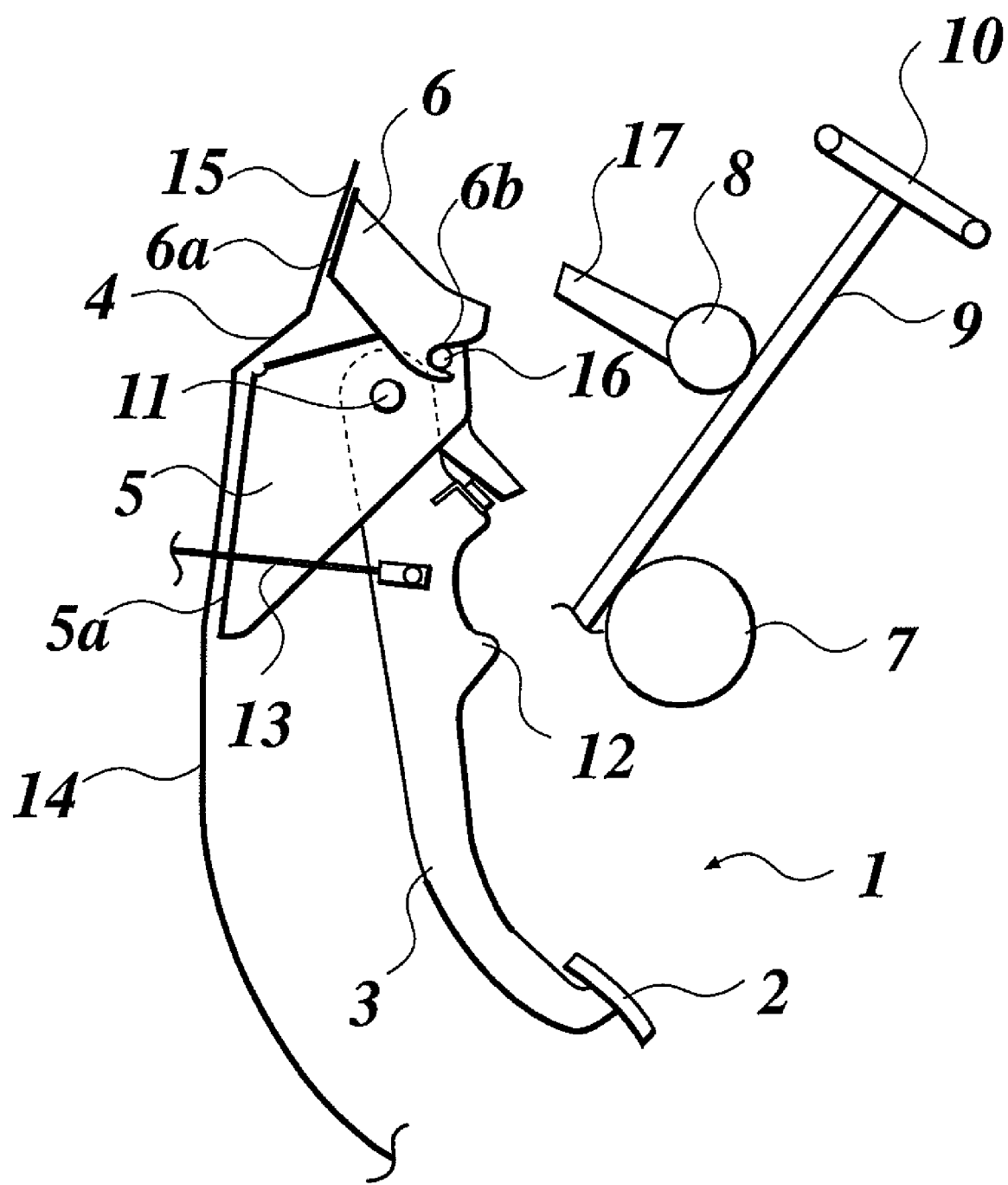
FIG. 1 This shows a first embodiment of the invention and is a side view for explaining the periphery of the brake pedal of the brake apparatus for vehicle.
Figure 2:
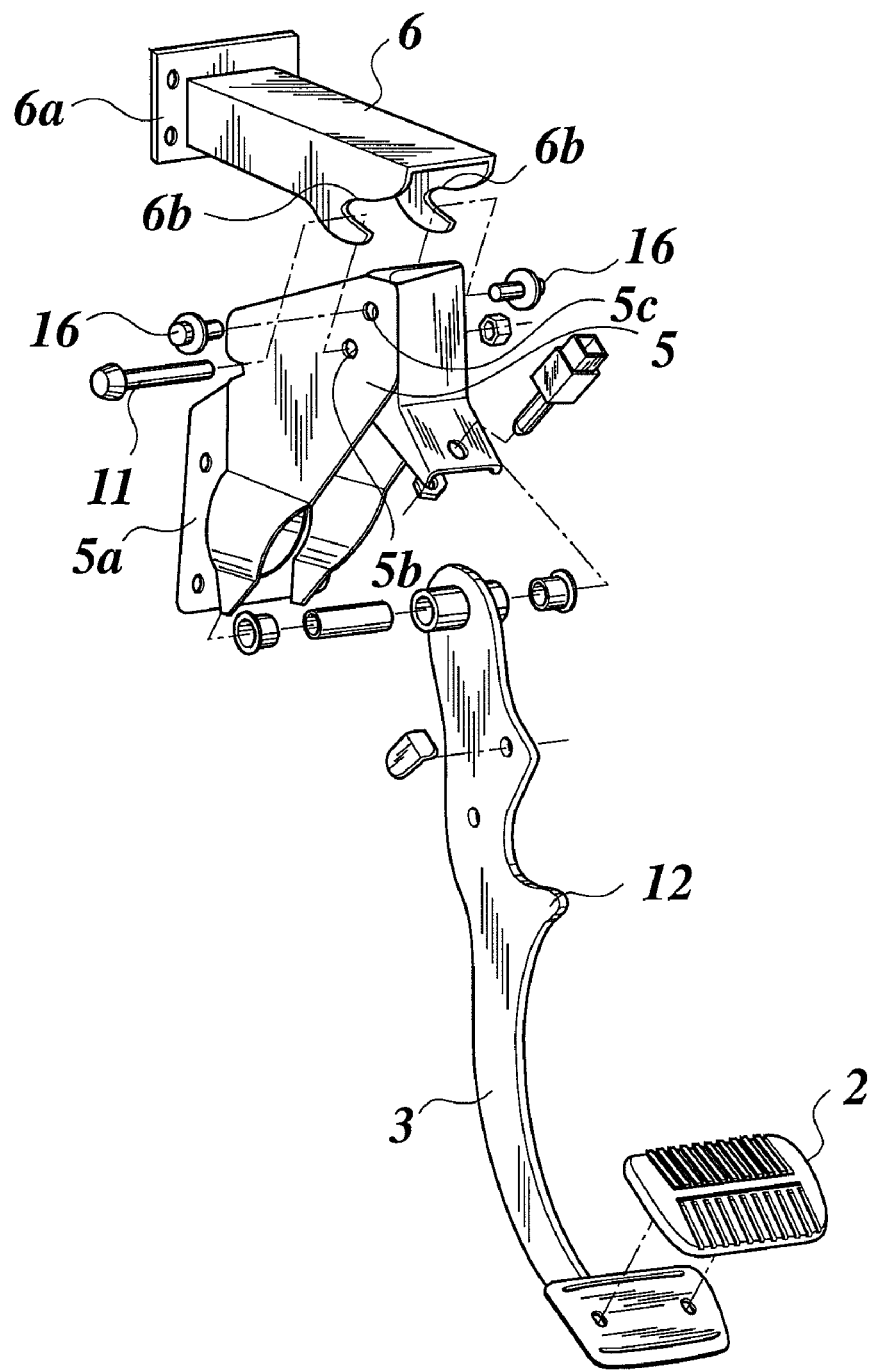
FIG. 2 This is an exploded perspective view of the periphery of the brake pedal of the brake apparatus for vehicle.
Figure 3:
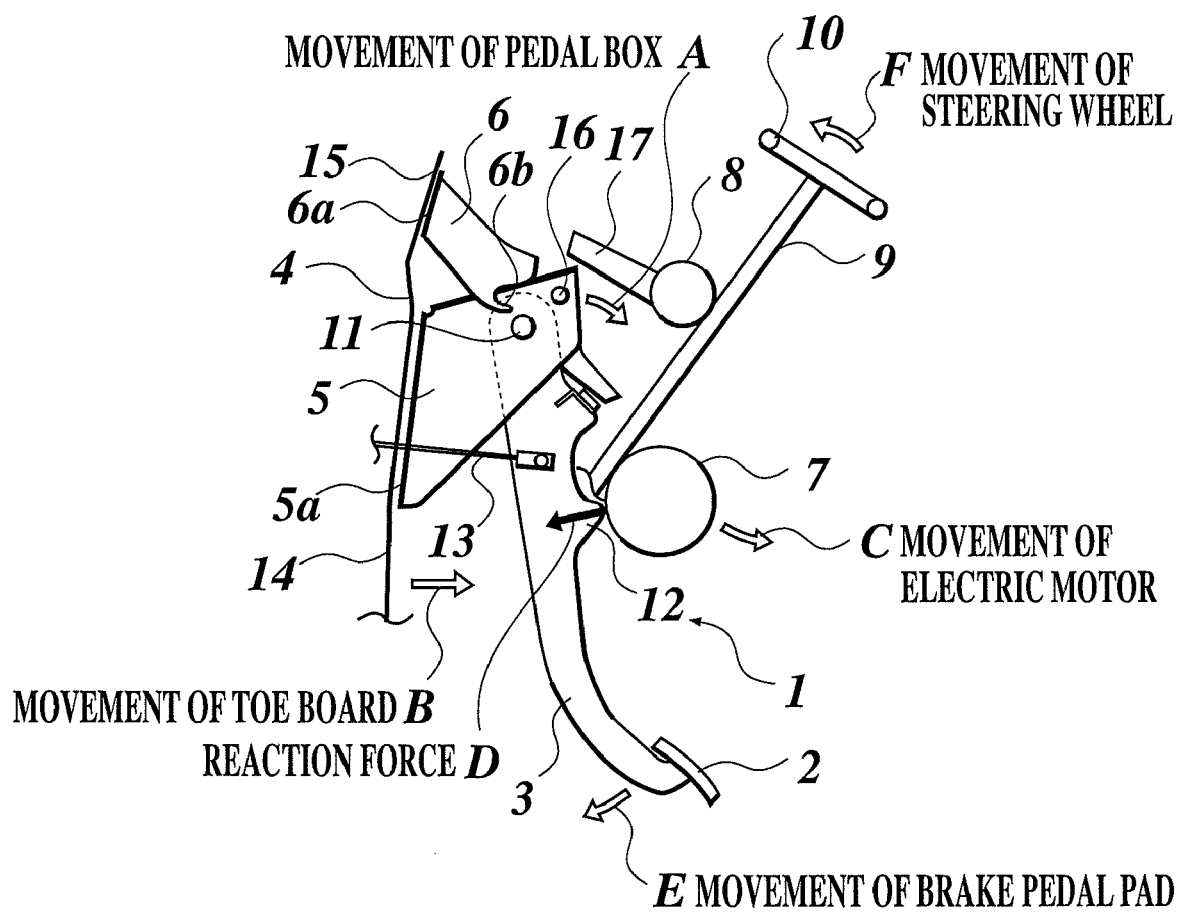
FIG. 3 This is an explanation view for illustrating a behavior of the brake apparatus for vehicle at a time of a front collision of the vehicle.

FIGS. 1-3 show the first embodiment of the invention, wherein FIG. 1 is a side view for explaining the periphery of the brake pedal of the brake apparatus for vehicle, FIG. 2 is an exploded perspective view of the periphery of the brake pedal of the brake apparatus for vehicle, and FIG. 3 is an explanation view for illustrating a behavior of the brake apparatus for vehicle at a time of a front collision of the vehicle. In FIG. 3, arrow A shows a movement of a pedal box, arrow B shows a movement of a toe board, arrow C shows a movement of an electric motor, arrow D shows a reaction force, arrow E shows a movement of a pad of the brake pedal, and arrow F shows a movement of a steering wheel.

As shown in FIG. 1, the brake apparatus for vehicle 1 is provided with a pad 2 to be pressed by an occupant in a lower end side, and a brake pedal 3 to be rotatable around a point in an upper end side. The brake apparatus for vehicle 1 pivotally supports the brake pedal 3 and has a pedal box 5 provided on a partition panel 4 extending in approximate upward and downward directions. Further, the brake apparatus 1 has a pedal bracket 6 which is provided on the partition panel 4, to support the pedal box 5 from above.

In the rear side of the brake pedal 3, an electric motor 7 of a power steering apparatus is arranged. The electric motor 7 is disposed in a lower end side of a steering column 9 which is supported by a steering support beam 8. At an upper end side of a steering column 9, a steering wheel 10 is provided.

As shown in FIG. 2, the brake pedal 3 extends in approximate upward and downward directions and has a plate-like shape the surface normal of which is in a horizontal direction. The upper side of the brake pedal 3 is pivotally supported by the pedal box 5 through a support pin 11, to be constituted so that the pad 2 in the lower end side thereof can rotationally move in a front and rear direction. As shown in FIG. 1, the brake pedal 3 has a protrusion portion 12 formed to protrude rearward toward the electric motor 7. In the embodiment, the protrusion portion 12 is formed around the central portion of the brake pedal 3 in the vertical direction. A push-pull rod 13 to transmit a stepping force to a master cylinder (not shown) is connected to an upper side portion of the protrusion portion 12.

In the embodiment, the partition panel 4 is made by welding a lower toeboard 14 with an upper bulkhead 15. As shown in FIG. 1, the pedal box 5 is provided on the toeboard 14 and the pedal bracket 6 is provided on the bulkhead 15.

The pedal box 5 has front and lower portions which are opened and has a box-shaped portion in which the inner space becomes gradually up and narrower rearward. On the right and left peripheral sides in the front side of the pedal box 5, flanges 5a which extend in the right and left outward direction and are attached firmly to the toeboard 14 of the partition panel 4, are provided (refer to FIG. 2). In the right and left side surfaces of the pedal box 5, shaft holes 5b for passing the above described support pin 11 therethrough, are formed. At upper rear side corner portions in the right and left side surfaces of the pedal box 5, bolt holes 5c for passing bolts 16 therethrough, are formed. The bolts 16 attach the pedal box 5 to the pedal bracket 6. In such a manner, support for the pedal box 5 by the pedal bracket 6 improves the stiffness and strength of the pedal box 5, and therefore enhances the operational feeling and reliability of the brake pedal 3.

As shown in FIG. 2, the pedal bracket 6 has front, lower and rear portions which are opened and has a box-shaped portion in which the inner space becomes gradually down rearward. On the right and left peripheral sides in the front side of the pedal bracket 6, flanges 6a which extend in the right and left outward direction and are attached firmly to the bulkhead 15 of the partition panel 4, are provided. At lower rear side corner portions in the right and left side surfaces of the pedal bracket 6, bolt holes 6b for passing the above described bolts 16 therethrough, are formed. Each of the bolt holes 6b has a cutout having an opening approximately rearward. In the embodiment, the bolt holes 6*b* are formed to have openings to slope gradually down rearward. Therefore, because treatment for the bolts 16 can be performed from the right and left outward sides, it is possible to work for attachment or detachment of the pedal box 5 to or from the pedal bracket 6 without removing an instrument panel from the vehicle body side. Therefore, workability is dramatically improved in comparison with the case of bolt holes formed in the upper surface.

The electric motor 7 has an approximately cylindrical column shape extending in the right and left direction, to assist and control for rotational operation of the steering wheel 10. The electric motor 7 is arranged at the rear of the brake pedal 3 so that it makes contact with the brake pedal 3 moving back at a time of a front collision of the vehicle.

The steering support beam 8 is provided with a guide member 17 to control upward movement of the brake pedal 3 at the time of a front collision of the vehicle. In the embodiment, the guide member 17 is formed to slope gradually up frontward from the front side of the steering support beam 8.

In the brake apparatus for vehicle 1 having a structure described above, at a time of a front collision of the vehicle, the partition panel 4 moves backward and the brake pedal 3 moving backward together with the partition panel 4 gets into contact with the electric motor 7 of the power steering apparatus. As a result, a reaction force is given to the brake pedal 3 from the electric motor 7, so that the backward movement of the brake pedal 3 is controlled (refer to FIG. 3). As shown in FIG. 3, the amount of backward movement of the toeboard 14 is larger than that of the bulkhead 15. Therefore, when the brake pedal 3 rotates around the pedal box 5, because the brake pedal 3 gets into contact with the electric motor 7 at a position apart from the pedal box 5, it is possible to counter with the moment caused in the brake pedal 3 by a relatively small reaction force.

Since each of the bolt holes 6*b* of the pedal bracket 6 has a cutout opened approximately rearward, when the pedal box 5 relatively moves backward with respect to the pedal bracket 6 at a time of a front collision of the vehicle, as shown in FIG. 3, the bolts 16 get out of the bolt holes 6*b* of the pedal bracket 6 through the openings, the attachment thereof is released, and the pedal bracket 6 moves backward independent of the pedal box 5. In the embodiment, the upper end of the brake pedal 3 is guided rearward without moving upwards because the bolt holes 6*b* are formed to slope gradually down rearwards.

According to the embodiment, provision of the pedal bracket 6 enables to keep enhancement of the operational feeling and reliability of the brake pedal 3, and a stable backward movement of the brake pedal 3, at a time of a front collision of the vehicle. Therefore, it has a great practical advantage.

In a case that the pedal box 5, the pedal bracket 6 and the like are not only moving backward but also moving upwards at a time of a front collision of the vehicle, these parts make contact with the guide member 17 to correct such a behavior to only moving backward without moving upwards. In the embodiment, because the upper end of the brake pedal 3 moves backward by the guide member 17 in the state of the brake pedal 3 held by the electric motor 7, the brake pedal 3 shows a behavior of rotation around the electric motor 7. Accordingly, the pad 2 which is provided at the lower end of the brake pedal 3 comes to move forward relatively. Thereby, movement of the brake pedal 3 toward the upper rear side is restrained. As a result, it is possible to prevent the pad 2 which is provided at the lower end of the brake pedal 3, from becoming contact with the lower leg of the driver.

Further, in the embodiment, since the protrusion portion 12 is formed on the brake pedal 3, only portion necessary for being contact with the electric motor 7 comes to protrude rearwards, with leaving the position of the pad 2 of the brake pedal 3 and the like as it is.

In order to bring the brake pedal into contact with the electric motor 7 at a time of a front collision of the vehicle, it is preferable to have a structure in which the brake pedal 3 is close to the electric motor 7. However, since the brake pedal 3 is operated by an occupant pressing the pad 2 which is at a lower end, it is necessary to ensure a space for operation behind the pad 2 of the brake pedal 3. Therefore, the brake pedal 3 comes to be provided close to the partition panel 4.

Accordingly, it is possible to realize bringing the brake pedal into certain contact with the electric motor 7 at a time of a front collision of the vehicle, without necessity of the brake pedal 3 having a whole shape extending rearwards, and providing increase of production costs and the like due to weight increase or layout change of the brake pedal 3.

Since the apparatus has a structure in which the load from the brake pedal 3 is received by the electric motor 7, it is possible to prevent concentration of load to the steering support beam 8 from the pedal box 5 and the brake pedal 3, which is a problem of the conventional technique, and to reduce the amount of backward movement of the steering support beam 8 and the steering wheel 10. Specifically, in a case that the electric motor 7 is mounted to the lower side of the steering column 9, the electric motor 7 is moved backward by the load from the brake pedal 3, and then the steering column 9 is rotated around the steering support beam 8. As a result, the steering wheel 10 which is in the upper side of the steering column 9 moves forward relatively with respect to the steering support beam 8. Thereby, rearward movement of the steering wheel 10 is effectively restrained.

As described above, according to the brake apparatus for vehicle 1 of the present embodiment, it is possible to reduce the amount of backward movement of the brake pedal 3 at a time of front collision of the vehicle and to reduce the amount of backward movement of the steering wheel 10. As a result, safety of occupants at a time of front collision of the vehicle can be enhanced remarkably.

In the above-described embodiment, although only the brake pedal 3 having a protrusion portion 12 formed thereon is shown, of course, the brake pedal may have no protrusion portion 12 as long as the brake pedal gets into contact with the electric motor 7 at a time of front collision of the vehicle.

In the above-described embodiment, the case of the guide member 17 provided is shown. However, in a case of type of vehicle in which the amount of backward movement of the brake pedal 3 at a time of front collision of the vehicle is basically small, or the behavior of the brake pedal 3 is stable, provision of the guide member 17 can be omitted. Similarly, in a case of a structure in which stiffness, strength and the like of the pedal box 5 are ensured, in a case of type of vehicle in which operability of the brake pedal 3 is not emphasized, or the like, provision of the pedal bracket 6 can be omitted.

Figure 4:
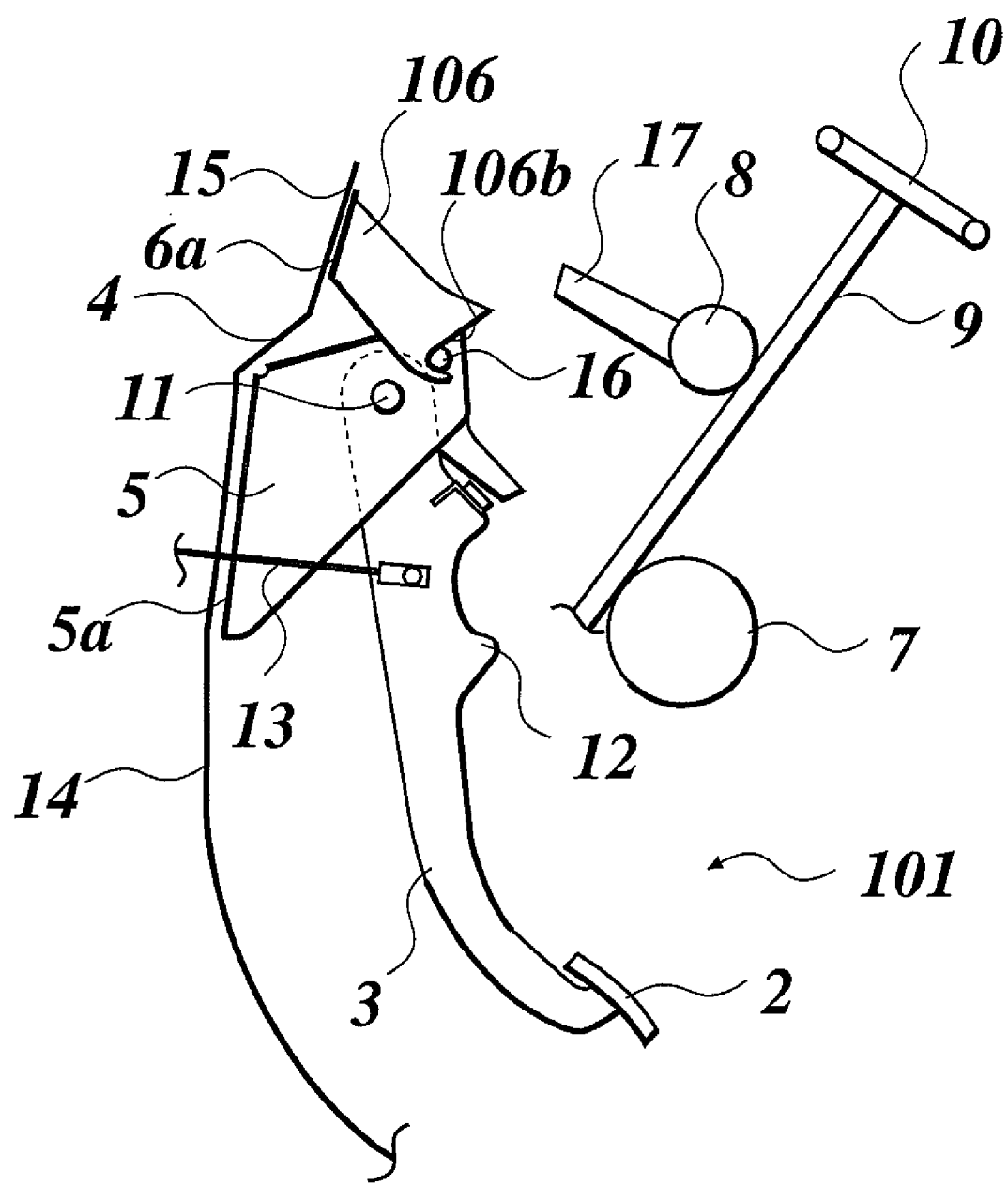
FIG. 4 This shows a second embodiment of the invention and is a side view for explaining the periphery of the brake pedal of the brake apparatus for vehicle.
Figure 5:
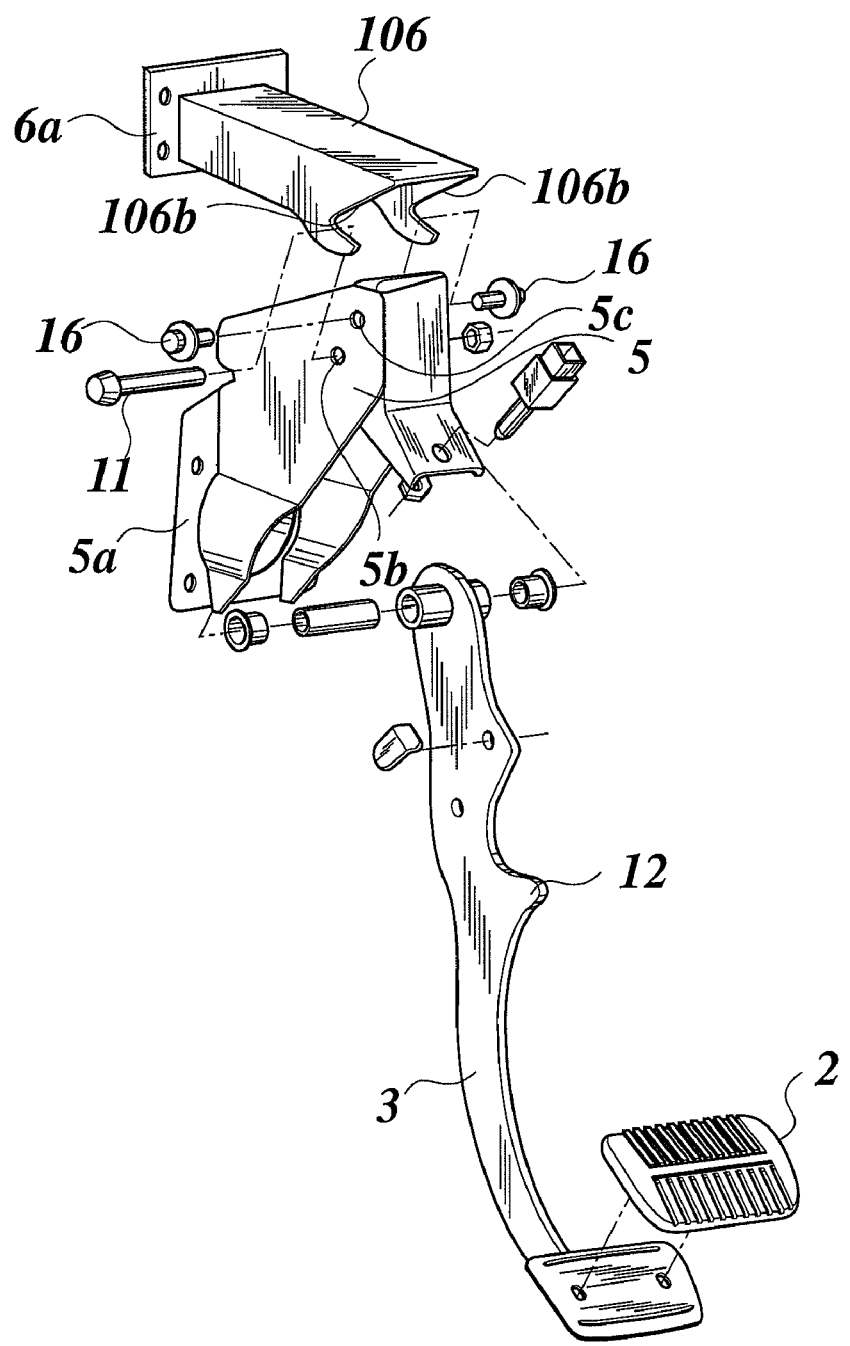
FIG. 5 This is an exploded perspective view of the periphery of the brake pedal of the brake apparatus for vehicle.
Figure 6:
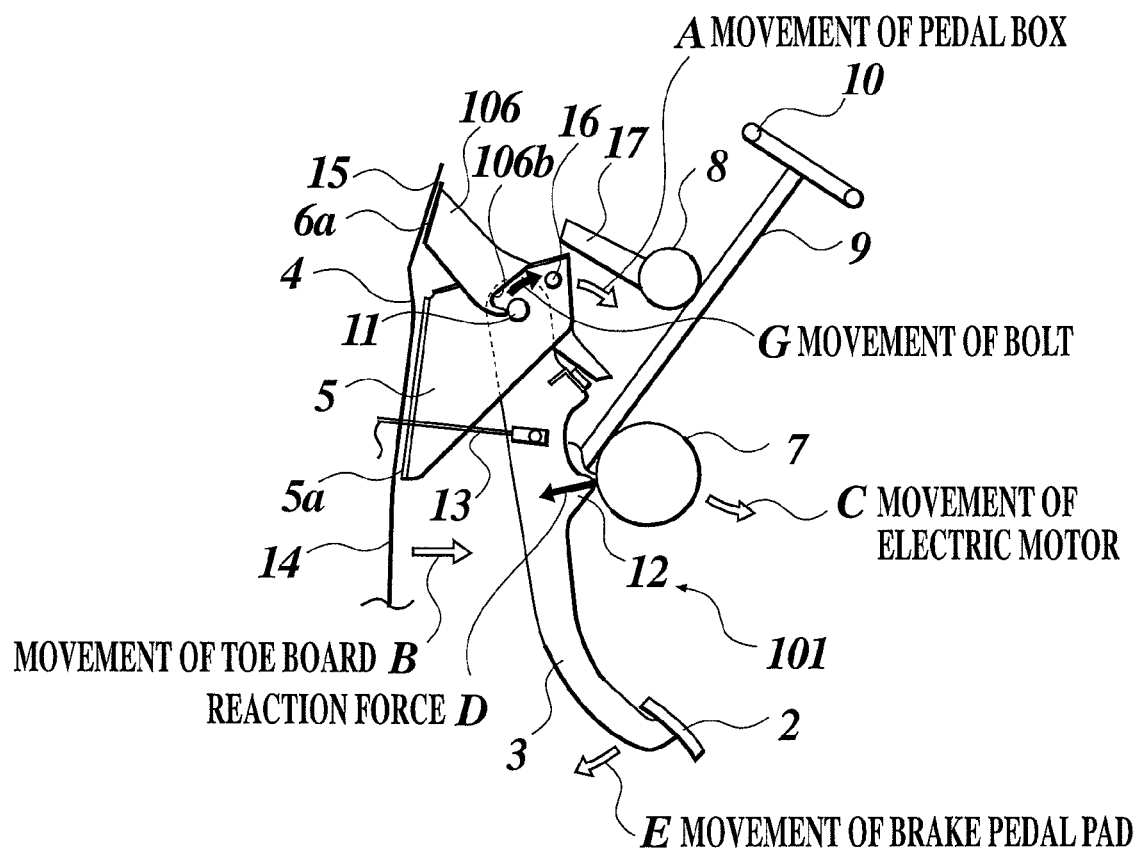
FIG. 6 This is an explanation view for illustrating a behavior of the brake apparatus for vehicle at a time of a front collision of the vehicle.

FIGS. 4-6 show the second embodiment of the invention, wherein FIG. 4 is a side view for explaining the periphery of the brake pedal of the brake apparatus for vehicle, FIG. 5 is an exploded perspective view of the periphery of the brake pedal of the brake apparatus for vehicle, and FIG. 6 is an explanation view for illustrating a behavior of the brake apparatus for vehicle at a time of a front collision of the vehicle. The brake apparatus for vehicle 101 of the second embodiment is different from the brake apparatus for vehicle 1 of the first embodiment in the shape of bolt holes 106*b* of the pedal bracket 106. In FIG. 6, arrow A shows a movement of a pedal box, arrow B shows a movement of a toe board, arrow C shows a movement of an electric motor, arrow D shows a reaction force, arrow E shows a movement of a pad of the brake pedal, and arrow G shows a movement of a bolt.

As shown in FIG. 4, in the brake apparatus for vehicle 101, the bolt holes 106*b* of the pedal bracket 106 is widely opened rearward in comparison with that of the first embodiment of the invention. According to the opening of the bolt holes 106*b*, the pedal bracket 6 does not interfere with the bolt 16. Since the constituents such as the flange 6*a* of the pedal bracket 106 and the like except the bolt holes 106*b*, are the same as that of the first embodiment, explanation of such the constituents is omitted.

As shown in FIG. 5, concretely, the opening upper side of the bolt holes 106*b* is formed to have a linearly cut shape in upward and oblique-rearward direction. In the embodiment, at a time of front collision of the vehicle, the brake pedal 3 is moved in upward and rearward direction. That is, the opening of the bolt holes 106*b* is formed so that the pedal bracket 106 does not interfere with the bolt moving backward 16 at the time of front collision of the vehicle.

Therefore, according to the brake apparatus for vehicle 101 of the present embodiment, it is possible to release the bolt 16 smoothly out of the bolt holes 106*b* at the time of front collision of the vehicle because the pedal bracket 106 does not interfere with the bolt moving backward 16 at the time of front collision. Thereby backward movement behavior of the brake pedal 3 can be stabilized effectively. As described above, the principal feature of the brake apparatus for vehicle 101 of the second embodiment is on releasing the bolt 16 smoothly out of the bolt holes 106*b*. The second embodiment provides approximately the same function and effects as that of the first embodiment, except the function and effects regarding releasing the bolt 16 smoothly out of the bolt holes 106*b*.

It is preferable that the pedal bracket 106 has a structure to follow backward movement of the brake pedal 3 due to deformation of the partition panel 4 because it is possible to encourage releasing the bolt 16 smoothly out of the bolt holes 106*b*. For example, it is preferable to set the rigidity of the pedal bracket 106, which is a relatively low one so that the pedal bracket 106 follows backward movement of the brake pedal 3 but which does not interfere with operation of the brake pedal 3 by the driver.

In the second embodiment of the invention, the brake apparatus for vehicle 101 in which at a time of front collision of the vehicle, the pedal box 5 and the brake pedal 3 are moved in upward and rearward direction, and the bolt holes 106*b* is widely opened rearward, is shown. However, it is possible to prevent the interference between the bolt moving backward 16 and the pedal bracket 106 by at least opening the bolt holes in upward and rearward direction. The opening shape of the bolt holes 106*b* may be changed according to the movement direction of the pedal box 5 and the like, and also practical detail structure and the like may be changed appropriately.

The entire disclosure of Japanese Patent Application No. Tokugan 2004-287740 filed on Sep. 30, 2004 are incorporated herein by reference in its entirety.

INDUSTRIAL APPLICABILITY

As described above, the brake apparatus for vehicle according to the invention is useful as a brake apparatus for various types of vehicles, e.g., passenger automobile, bus, truck, trailer and the like. In particular, the brake apparatus is suitable to be used for a brake structure in which a brake pedal and a steering wheel move backward at a time of a front collision of the vehicle.

EXPLANATION OF REFERENCE NUMERAL 1 brake apparatus for vehicle
3 brake pedal
4 partition panel
5 pedal box
6 pedal bracket
6*b* bolt hole
7 electric motor
8 steering support beam
12 protrusion portion
16 bolt
17 guide member
101 brake apparatus for vehicle
106 pedal bracket
106*b* bolt hole

What is claimed is:

1. A brake pedal supporting structure for a vehicle, comprising:
    a partition panel extending in approximately upward and downward directions;
    a pedal box provided on the partition panel;
    a brake pedal pivotally supported by the pedal box and having a pad provided at a lower end of the brake pedal;
    a steering column supported by a steering support beam and having a steering wheel provided at an upper end of the steering column; and
    an electric motor of a power steering apparatus mounted on the steering column below the steering support beam,
    wherein the electric motor of the power steering apparatus is arranged at a position where the electric motor makes contact with the brake pedal moving backward for receiving a load from the brake pedal at a time of a front collision of the vehicle,
    wherein when the brake pedal moves backward at the time of a front collision of the vehicle, the brake pedal rotates around the electric motor so as to move the pad forward relative to the electric motor, and the steering column rotates around the steering support beam so as to move the steering wheel forward relative to the steering support beam.

2. The brake pedal supporting structure for a vehicle, as claimed in claim 1, wherein the brake pedal comprises a protrusion portion formed to protrude toward the electric motor.

3. The brake pedal supporting structure for a vehicle, as claimed in claim 2, wherein the steering support beam comprises a guide member to control upward movement of the pedal box at the time of a front collision of the vehicle.

4. The brake pedal supporting structure for a vehicle, as claimed in claim 3, further comprising
    a pedal bracket provided on the partition panel, to support the pedal box from above by a bolt and having a bolt engaging portion for engaging with the bolt, wherein the bolt engaging portion has a cutout opened approximately rearward.

5. The brake pedal supporting structure for a vehicle, as claimed in claim 4, wherein the cutout of the bolt engaging portion is formed in the pedal bracket so that the pedal bracket does not interfere with the bolt moving backward at the time of front collision of the vehicle.

6. The brake pedal supporting structure for a vehicle, as claimed in claim 2, further comprising a pedal bracket provided on the partition panel, to support the pedal box from above by a bolt and having a bolt engaging portion for engaging with the bolt, wherein the bolt engaging portion has a cutout opened approximately rearward.

7. The brake pedal supporting structure for a vehicle, as claimed in claim 6, wherein the cutout of the bolt engaging portion is formed in the pedal bracket so that the pedal bracket does not interfere with the bolt moving backward at the time of front collision of the vehicle.

8. The brake pedal supporting structure for a vehicle, as claimed in claim 1, wherein the steering support beam comprises a guide member to control upward movement of the pedal box at the time of a front collision of the vehicle.

9. The brake pedal supporting structure for a vehicle, as claimed in claim 8, further comprising a pedal bracket provided on the partition panel, to support the pedal box from above by a bolt and having a bolt engaging portion for engaging with the bolt, wherein the bolt engaging portion has a cutout opened approximately rearward.

10. The brake pedal supporting structure for a vehicle, as claimed in claim 9, wherein the cutout of the bolt engaging portion is formed in the pedal bracket so that the pedal bracket does not interfere with the bolt moving backward at the time of front collision of the vehicle.

11. The brake pedal supporting structure for a vehicle, as claimed in claim 1, further comprising a pedal bracket provided on the partition panel, to support the pedal box from above by a bolt and having a bolt engaging portion for engaging with the bolt, wherein the bolt engaging portion has a cutout opened approximately rearward.

12. The brake pedal supporting structure for a vehicle, as claimed in claim 11, wherein the cutout of the bolt engaging portion is formed in the pedal bracket so that the pedal bracket does not interfere with the bolt moving backward at the time of front collision of the vehicle.

* * * * *